(12) United States Patent
Gmeiner et al.

(10) Patent No.: US 6,425,986 B1
(45) Date of Patent: Jul. 30, 2002

(54) PROCESS FOR DEGASSING A PAPER STOCK SUSPENSION

(75) Inventors: Anton Gmeiner, Ravensburg; Michael Schwarz, Heidenheim, both of (DE)

(73) Assignee: Voith Sulzer Papiertechnik Patent GmbH, Ravensburg (DE)

( * ) Notice: Subject to any disclaimer, the term of this patent is extended or adjusted under 35 U.S.C. 154(b) by 0 days.

(21) Appl. No.: 09/697,722

(22) Filed: Oct. 27, 2000

(30) Foreign Application Priority Data

Oct. 29, 1999 (DE) ........................................ 199 52 129

(51) Int. Cl.$^7$ .............................................. B01D 19/00
(52) U.S. Cl. .................... 162/380; 162/381; 96/193; 209/17
(58) Field of Search ................. 162/55, 380, 381; 55/383, 437, 439, 467; 96/193; 209/2, 12, 17, 211

(56) References Cited

U.S. PATENT DOCUMENTS

| 4,209,359 | A |   | 6/1980 | Sethy ........................... 162/29 |
|---|---|---|---|---|
| 5,084,161 | A | * | 1/1992 | Vikio ............................ 209/2 |
| 5,268,077 | A |   | 12/1993 | Bubik et al. ................. 162/380 |
| 5,868,905 | A |   | 2/1999 | Graf et al. .................. 162/380 |
| 5,930,998 | A |   | 8/1999 | Blangetti et al. ............. 60/646 |

FOREIGN PATENT DOCUMENTS

| DE | 4106140 | 9/1992 |
|---|---|---|
| EP | 501144 | 9/1992 |
| EP | 781583 | 7/1997 |

* cited by examiner

*Primary Examiner*—Dean T. Nguyen
(74) *Attorney, Agent, or Firm*—Greenblum & Bernstein, P.L.C.

(57) ABSTRACT

Process and apparatus for degassing a flowing fibrous paper suspension. The process includes separating the suspension into partial streams, spraying the partial streams into a degassing chamber under vacuum, and exposing the suspension to the degassing vacuum for at least 10 seconds. In this manner, gas within the suspension is separated from the suspension. The process also includes suctioning the separated gas out of the degassing chamber. The apparatus includes a degassing chamber structured to subject the suspension to a vacuum sufficient for degassing, an element arranged at an inlet of said degassing chamber for dividing the suspension into a plurality of partial streams, and a suction device for removing separated gas from said degassing chamber. The apparatus is structured and arranged so that the suspension is subjected to the degassing vacuum for a duration of at least 10 seconds.

24 Claims, 4 Drawing Sheets

PROCESS FOR DEGASSING A PAPER STOCK SUSPENSION

CROSS-REFERENCE TO RELATED APPLICATIONS

The present application claims priority under 35 U.S.C. §119 of German Patent Application No. DE 199 52 129.8, filed on Oct. 29, 1999, the disclosure of which is expressly incorporated by reference herein in its entirety.

BACKGROUND OF THE INVENTION

1. Field of the Invention

The invention relates to a process for degassing a paper stock suspension using a vacuum, in which the suspension is separated into partial streams and is sprayed into a degassing chamber that is influenced by a vacuum. The gas separated here, e.g., air, is suctioned out of the degassing chamber.

Gas bubbles in the stock suspension worsen the paper quality and enhance undesired pulsing. Therefore, it is necessary to degas, in particular in fast running paper machines that produce sorts of paper, e.g., newspapers, LWC, coating prints, etc., made with suspensions using raw materials such as mechanical wood pulp, deinked sorted used paper, or pulp. The gasses contained therein usually include of air. In general, the degassing occurs in that the suspension is sprayed and exposed to a vacuum. This vacuum is set as high as possible, preferably up to the pressure of steam.

2. Discussion of Background Information

A process for degassing a paper stock suspension is known from DE 41 06 140 A1 in which the suspension is divided into a number of partial streams and then is sprayed in a degassing chamber. With the aid of the high number of very small partial streams suggested there, as good a degassing as possible is to occur. While such a process does have an acceptable effectiveness, it is expensive in its use of energy as well as in relation to the amount of machinery.

SUMMARY OF THE INVENTION

The present invention provides a degassing process that further increases the degassing effectiveness and reduces the expense necessary therefor, in particular the use of energy.

The present invention provides a degassing process similar in general to the above-described process that further includes exposing the fibrous paper suspension to the vacuum necessary for the degassing for a duration of at least 10 seconds.

With the aid of the new process, the paper stock suspension to be degassed is kept under the influence of a comparatively strong vacuum, in particular for a duration whose length is several times larger than the processes known up to now. Special phenomena are put into consideration that are obviously connected to the nature of suspended paper fibers containing gas. Surprisingly, it is particularly advantageous when the gas, diluted or adhering to the fibers, is given more time to separate or detach and form a gas bubble. The degassing effectiveness can be increased in this manner, which leads to, e.g., a lowering of the requirements of the adjacent degassing in the degassing chamber. The separation into partial streams and sprays in the degassing chamber is expensive, both in the devices and the energy consumption. If, however, the fibrous stock suspension has previously been exposed to a vacuum, it is possible for either some of the gasses to already be removed or at least pulled far enough out of the fibrous connection that the subsequent degassing in the degassing chamber is facilitated. Extending the vacuum duration can also occur after the spraying, e.g., in a post-degassing chamber.

An additional advantage can be achieved in creating tangential currents by correlating guidance of the currents in the pre-gassing chamber, which even better expel the already separating gas bubbles out of the fibrous web. For this purpose, integrated current devices can be used advantageously that are known, e.g., from static mixers.

In the design of the device forming the pre-degassing chamber or the post-degassing chamber, attention must be paid to allowing the necessary lag time for all components of the fibrous stock suspension and, thus, avoiding undesired currents due to shorts or mixings. The measures necessary therefor are known to one trained in the art. They can be designed in such a way that they aid in the above-mentioned lateral currents in the suspension as well.

Another improvement presents itself when the partial streams in the degassing chamber are directed downwardly, since then they cause a smaller loss of pressure in the device creating the partial streams, e.g., a perforated metal sheet. Based on a maximal vacuum in the degassing chamber (the steam pressure) this leads to a higher vacuum in the pre-degassing.

The instant invention is directed to a process for degassing a flowing fibrous paper suspension. The process includes separating the suspension into partial streams, spraying the partial streams into a degassing chamber under vacuum, and exposing the suspension to the degassing vacuum for at least 10 seconds. In this manner, gas within the suspension is separated from the suspension. The process also includes suctioning the separated gas out of the degassing chamber.

In accordance with a feature of the present invention, the gas may include air.

According to another feature oft he instant invention, the suspension is exposed to the degassing vacuum for at least 30 seconds.

An absolute pressure in the degassing chamber may be comparable to a steam pressure of the fibrous paper suspension at the prevailing temperature. The degassing pressure can be equivalent to the steam pressure of the fibrous paper suspension during the entire degassing time.

According to still another feature of the invention, the separating into and spraying of partial streams may be performed with a loss of pressure in the suspension of no more than about 0.4 bar. Further, the loss of pressure due to the separating into and spraying of partial streams can be no more than about 0.15 bar.

In accordance with a further feature of the present invention, the partial streams can be directed downwardly. Alternatively, the partial streams may be directed upwardly.

Prior to separating the suspension into partial streams, the fibrous paper suspension can be exposed to a vacuum sufficient for degassing a pre-degassing chamber. An absolute pressure in the pre-degassing chamber may be no more than about 0.2 bar. The fibrous paper suspension can be guided in the pre-degassing chamber such that tangential currents develop to facilitate separation of the gas bubbles from the suspension. Moreover, the process can further include collecting some of the separated gas in the pre-degassing chamber, and suctioning at least part of the collected gas out of the pre-degassing chamber. The fibrous paper suspension may be guided downwardly from the pre-degassing chamber to the degassing chamber via a falling distance with a height of at least about 1 m. The pre-degassing chamber can include a horizontally positioned oblong container.

After the degassing chamber, the fibrous paper suspension can be exposed to a vacuum sufficient for degassing a post-degassing chamber. The vacuum in the post-degassing chamber may be equivalent to the degassing vacuum.

Further, the present invention is directed to a process for degassing a fibrous material suspension in an apparatus that includes a degassing chamber and an element arranged at an inlet of the degassing chamber for dividing the suspension into a plurality of partial streams. The process includes exposing the suspension in the apparatus to a vacuum sufficient to degas the suspension for a duration of at least 10 seconds, such that gas within the suspension in at least the degassing chamber is separated from the suspension. The process also includes suctioning at least a portion of the separated gas out of the degassing chamber.

In accordance with a feature of the invention, the apparatus can further include a pre-degassing chamber arranged upstream from the degassing chamber, relative to a suspension flow direction, and the pre-degassing chamber can be under a vacuum sufficient for degassing. Further, the exposing of the suspension to the vacuum further may include forming tangential currents in the suspension in the pre-degassing chamber to remove gas in the suspension from the suspension, and suctioning at least a portion of the removed gas out of the pre-degassing chamber. The degassing chamber and the pre-degassing chamber can be arranged such that the suspension falls at least 1 meter from the pre-degassing chamber to the degassing chamber. The suspension may be directed downwardly through the element, or the suspension may be directed upwardly through the element.

In accordance with yet another feature of the present invention, the apparatus can further include a post-degassing chamber arranged downstream from the degassing chamber, relative to a suspension flow direction, and the exposing of the suspension to the vacuum may include exposing the suspension to a vacuum sufficient to degas the suspension for the duration to separate the gas within the suspension in the degassing chamber and in the post-degassing chamber from the suspension, and suctioning at least a portion of the separated gas out of the degassing chamber. The degassing of the suspension in the post-degassing chamber can include forming tangential currents in the suspension in the pre-degassing chamber.

The present invention is directed to an apparatus for degassing a flowing fibrous paper suspension. The apparatus includes a degassing chamber structured to subject the suspension to a vacuum sufficient for degassing, an element arranged at an inlet of said degassing chamber for dividing the suspension into a plurality of partial streams, and a suction device for removing separated gas from said degassing chamber. The apparatus is structured and arranged so that the suspension is subjected to the degassing vacuum for a duration of at least 10 seconds.

In accordance with a feature of the instant invention, the apparatus can further include a pre-degassing chamber arranged upstream from the degassing chamber, relative to a suspension flow direction. The pre-degassing chamber can be under a vacuum sufficient for degassing, and the pre-degassing chamber and the degassing chamber may be arranged such that the suspension is subject to the degassing vacuum in said chambers for the duration. Further, a suction device can be provided for removing separated gas from the pre-degassing chamber.

According to yet another feature of the present invention, the apparatus can further include a post-degassing chamber arranged downstream from the degassing chamber, relative to a suspension flow direction. The post-degassing chamber can be under a vacuum sufficient for degassing, and the post-degassing chamber and the degassing chamber may be arranged such that the suspension is subject to the degassing vacuum in said chambers for the duration. Further, a suction device can be provided for removing separated gas from said post-degassing chamber.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein they depict.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
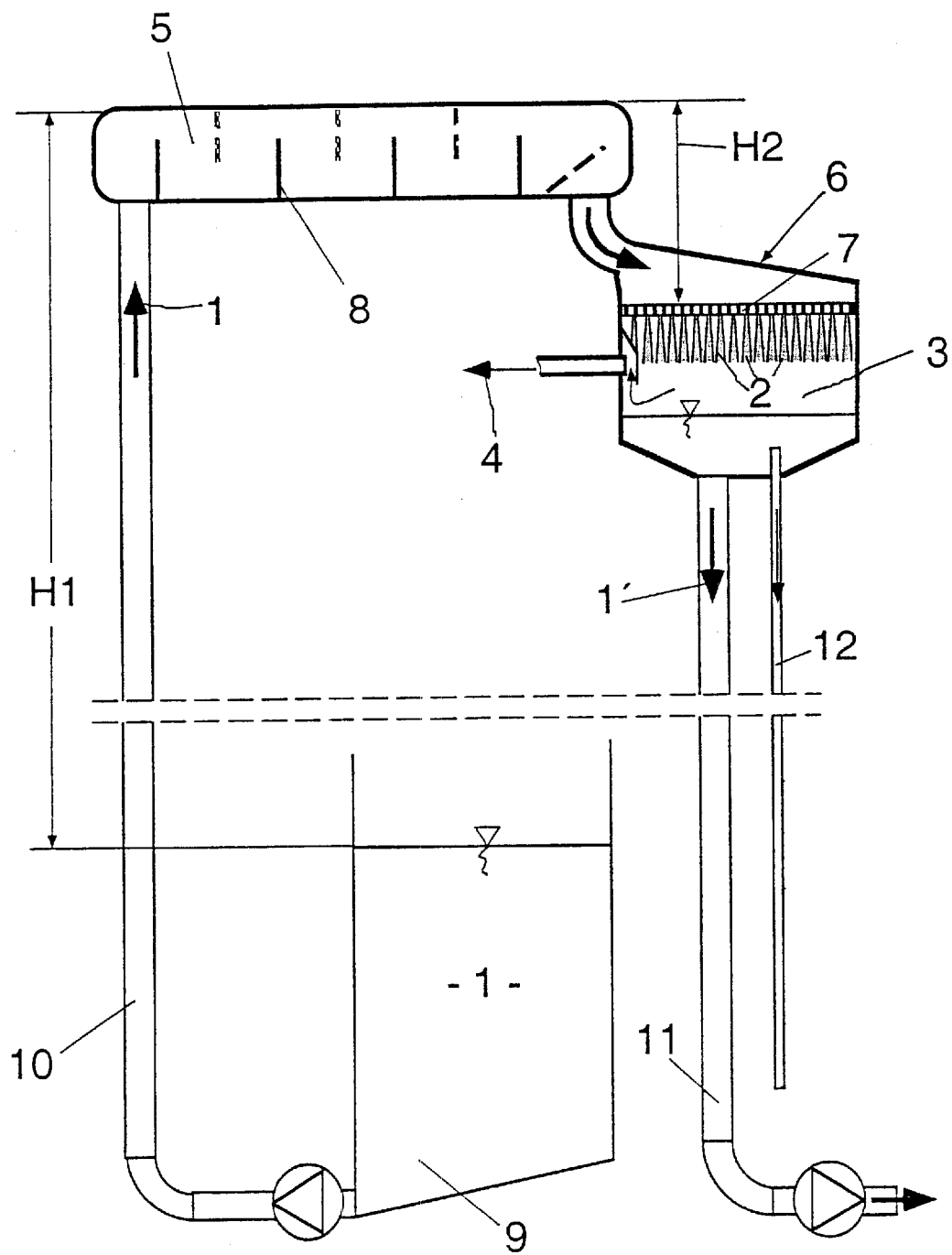
FIG. 1 schematically illustrates a device for performing the process according to the invention with a pre-degassing.

When performing the process in an arrangement according to FIG. 1, a fibrous paper suspension 1 is pumped first from a tank 9 through a riser 10 into a pre-degassing chamber 5. In so doing, a rising height HI is exceeded that is usually about. 10 to 12 m. The pre-degassing chamber 5 is advantageously positioned horizontally in order to utilize the geodetical level for the entire pre-degassing. In the pre-degassing chamber 5, a number of integrated devices 8 are positioned with which it is possible to prevent suspension 1 from rushing through in order to ensure the duration necessary for the degassing of all parts of suspension 1. From pre-degassing chamber 5, suspension 1 is guided into a spray chamber 6 in which it first passes wire plate 7 and, in doing so, is separated into a larger number of partial streams 2. Wire plate 7 has a falling height H2 in relation to the level of pre-degassing chamber 5. Degassing chamber 3, from which gas 4 is suctioned off, is-positioned below wire plate 7. This suctioning is functionally only implied. It can, for instance, also occur via a pipe inserted through wire plate 7 from above. Generally, integrated devices 8, known per se, must be present to retain the liquids transported along with the gas.

The vacuum at wire plate 7 is large enough to create an effective degassing of partial streams 2. Advantageously, it is equivalent to the steam pressure or is similar to the steam pressure of the suspension, with the pressure certainly being dependent on its temperature. Degassed suspension 1' collects in the lower part of degassing chamber 3 and is guided further toward the paper production via a relatively long falling pipe 11. Via falling pipe 11, the vacuum of degassing chamber 3 is maintained.

Figure 2:
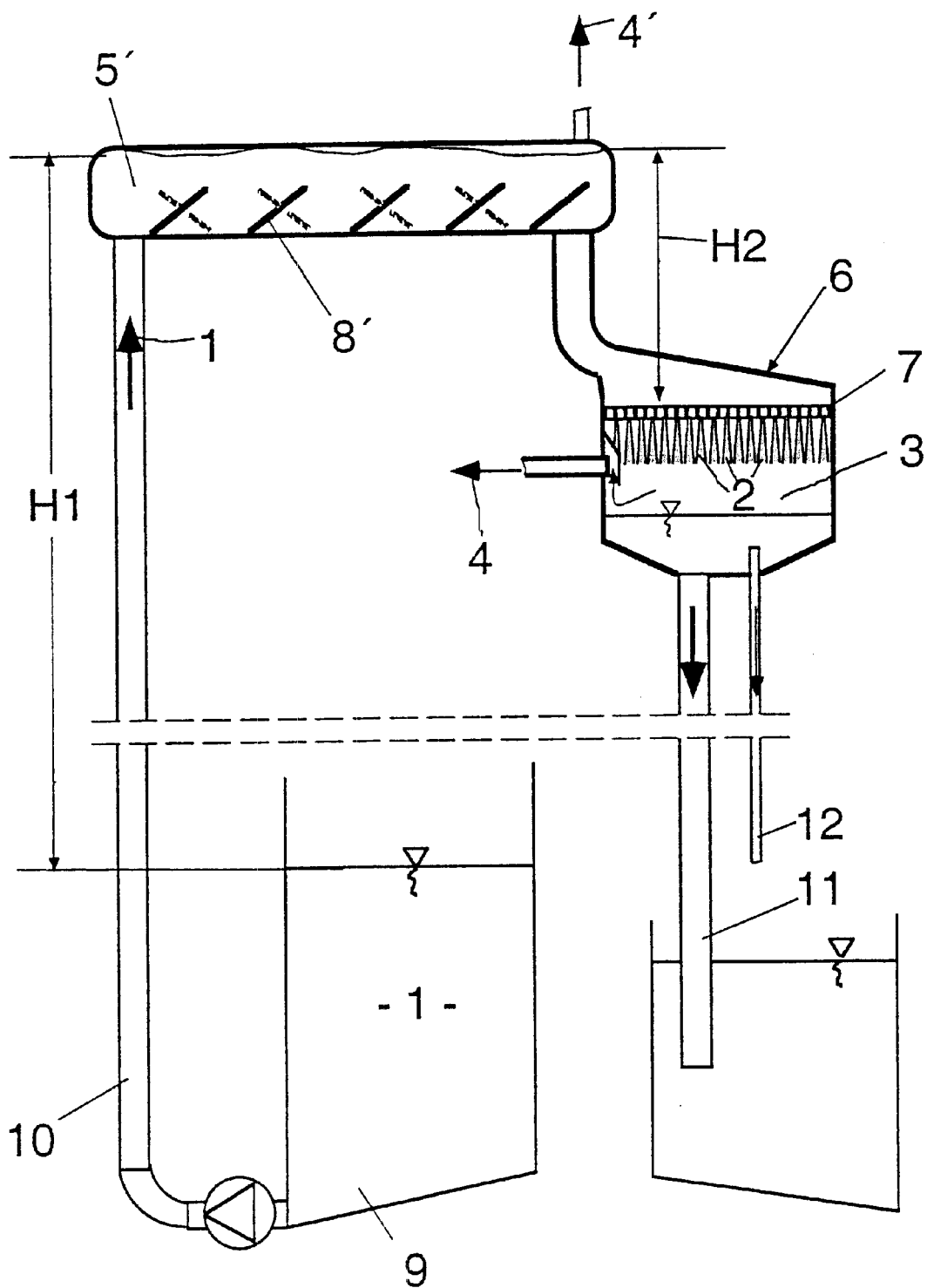
FIGS. 2 and 3 schematically illustrates alternative embodiments of the invention.

When falling height H2 to degassing chamber 3 is chosen such that it correlates to the loss of pressure at wire plate 7, pre-degassing chamber 5 receives about the same vacuum as degassing chamber 3. Moreover, partial streams 2 formed at wire plate 7 are aligned straight downward. In such a form of motion, the loss of pressure at wire plate 7 can remain comparatively low (e.g., less than about 0.4 bar, and preferably about 0.1–0.2 bar) This means that falling height H2 can be comparatively low, which leads to a saving in space in the height of the arrangement. In contrast, FIG. 2 schematically illustrates an arrangement in which a saving in space is irrelevant so that a higher loss of pressure at wire plate 7 can be accepted. FIG. 1 also shows an overflow pipe 12 serving for the control.

Due to the vacuum present in pre-degassing chamber 5, gas bubbles form during the long lag time, which are carried along with suspension 1 and led into degassing chamber 3, which certainly requires a speed of stream higher than the rising tendency of the gas bubbles. Suspension 1 is subjected to the degassing vacuum for at least 10 seconds, and preferably at least 30 seconds. However, it is also possible to operate pre-degassing chamber 5' in such a way that the gas bubbles rise and collect in an upper area of the container forming this chamber. This variant, advantageous in many cases, is illustrated shown in FIG. 2, where air 4' is suctioned off from pre-degassing chamber 5' and only then is suspension 1 caused to sink via falling height H2 to wire plate 7. Integrated devices 8' enhance the separation of the gas bubbles without preventing them from rising. As mentioned above, a large falling height H2 was selected in this representation.

Figure 3:
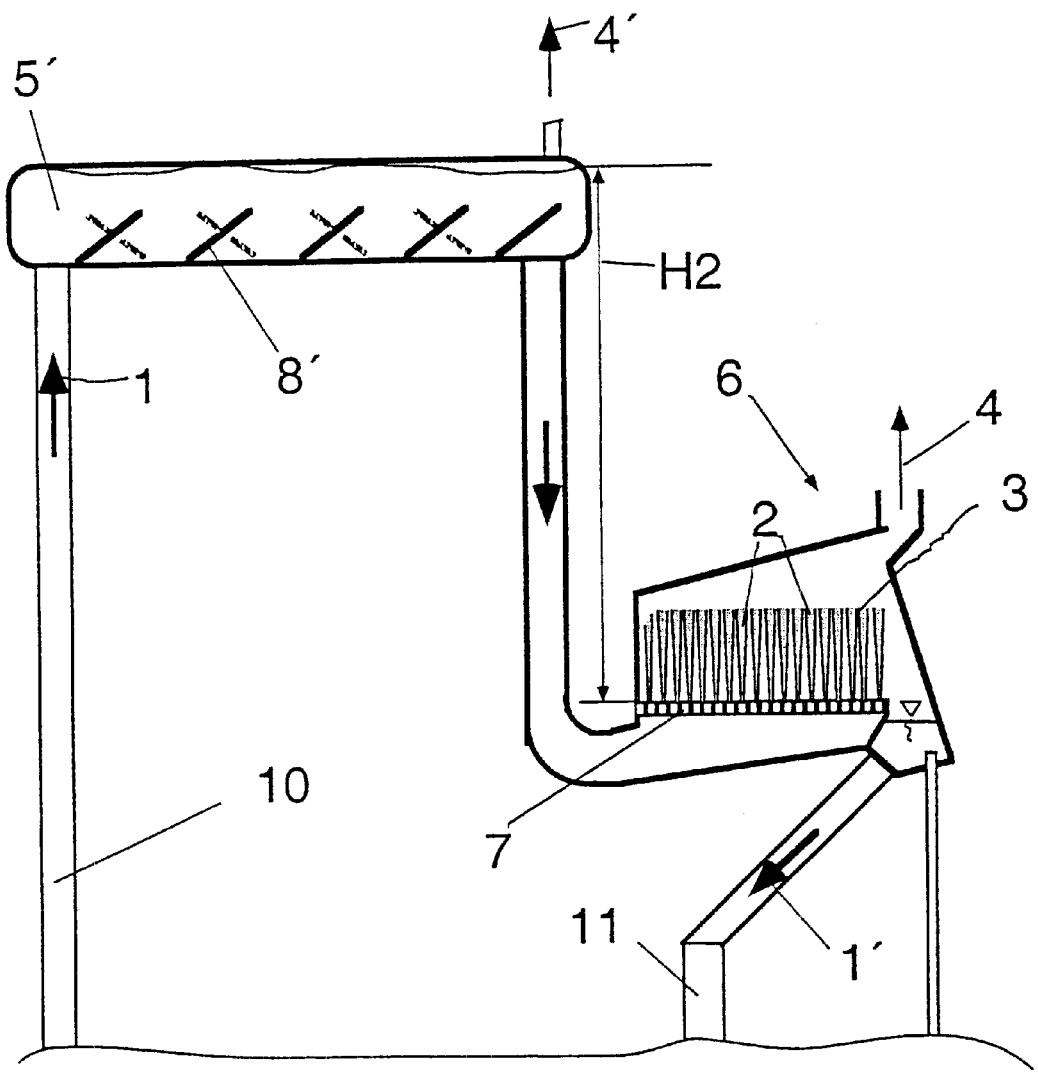

In certain cases, e.g., in which both space for a highly positioned pre-degassing chamber 5' and a powerful pump for suspension 1 are present, a higher difference in pressure can be provided at wire plate 7. In such a case, an upwardly streaming direction of partial streams 2, which is common and known per se, is also possible, as illustrated in FIG. 3.

Figure 4:
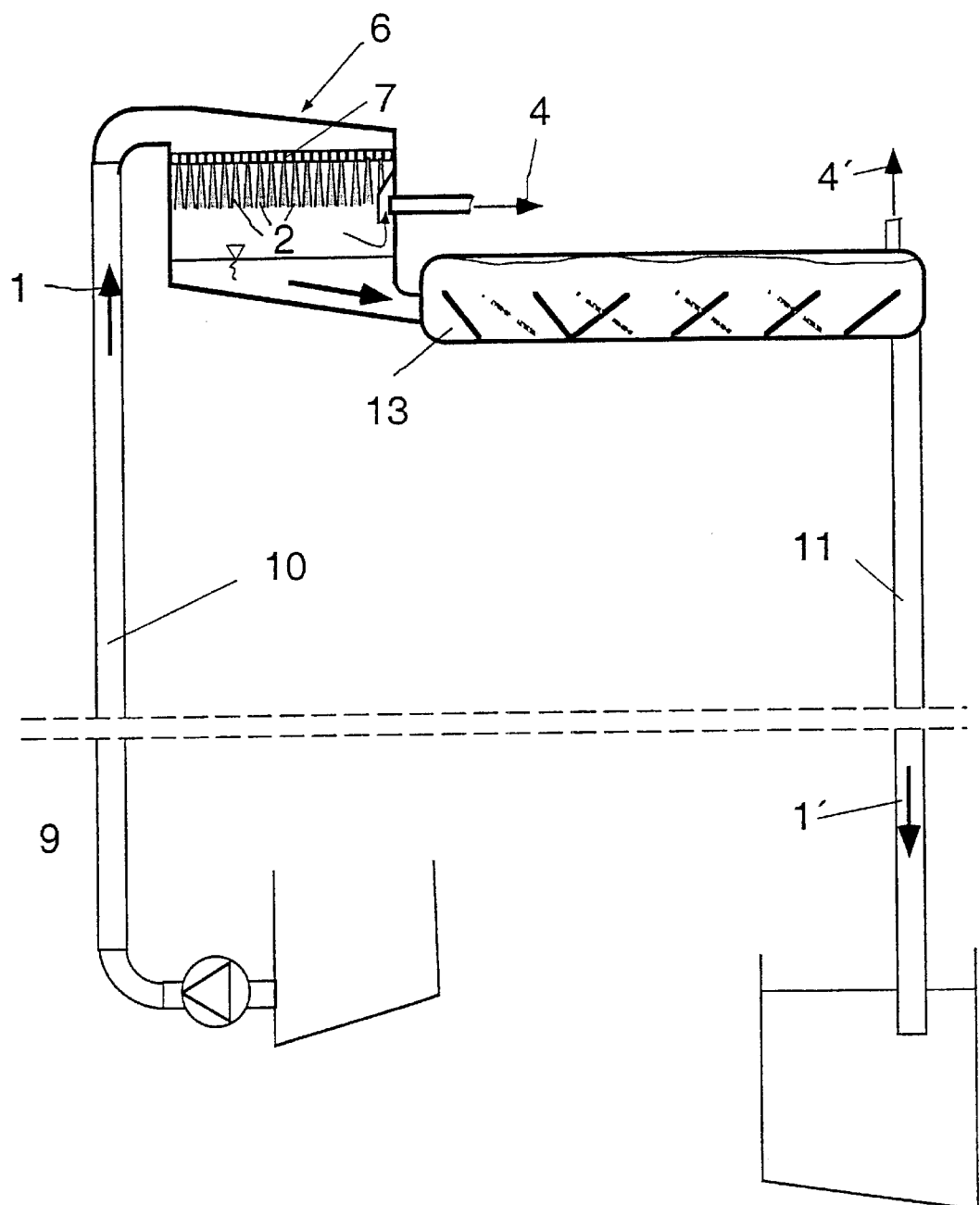
FIG. 4 schematically illustrates a further embodiment with post-degassing.

Another possibility for significantly extending the duration of degassing is shown in FIG. 4. In contrast to the previously described examples in this embodiment, fibrous paper suspension 1 is led directly into a spraying chamber 6, whose degassing chamber 3 is exposed to the vacuum necessary for degassing. Having been treated in this way and degassed, suspension 1 is then guided into a post-degassing chamber 13. The container housing post-degassing chamber 13 is similar or identical to the embodiment previously described for pre-degassing chamber 5'. It is again crucial for the necessary vacuum to be maintained and for the degassing time to be at least 10 seconds, and preferably at least 30 seconds. This embodiment is particularly advantageous when the gas 4" is collected and guided out of post-degassing chamber 13.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A process for degassing a flowing fibrous paper suspension, comprising:
    separating the suspension into partial streams that are sprayed into a degassing chamber under vacuum;
    exposing the suspension to the degassing vacuum for at least 10 seconds, whereby gas within the suspension is separated from the suspension; and
    suctioning the separated gas out of the degassing chamber.

2. The process in accordance with claim 1, wherein the gas comprises air.

3. The process in accordance with claim 1, wherein the suspension is exposed to the degassing vacuum for at least 30 seconds.

4. The process in accordance with claim 1, wherein an absolute pressure in the degassing chamber is comparable to a steam pressure of the fibrous paper suspension at the prevailing temperature.

5. The process in accordance with claim 4, wherein the degassing pressure is equivalent to the steam pressure of the fibrous paper suspension during the entire degassing time.

6. The process in accordance with claim 1, wherein the separating into and spraying of partial streams is performed with a loss of pressure in the suspension of no more than about 0.4 bar.

7. The process in accordance with claim 6, wherein the loss of pressure due to the separating into and spraying of partial streams is no more than about 0.15 bar.

8. The process in accordance with claim 1, wherein the partial streams are directed downwardly.

9. The process in accordance with claim 1, wherein the partial streams are directed upwardly.

10. The process in accordance with claim 1, wherein, prior to separating the suspension into partial streams, the fibrous paper suspension is exposed to a vacuum sufficient for degassing a pre-degassing chamber.

11. The process in accordance with claim 10, wherein an absolute pressure in the pre-degassing chamber is no more than about 0.2 bar.

12. The process in accordance with claim 10, wherein the fibrous paper suspension is guided in the pre-degassing chamber such that tangential currents develop to facilitate separation of the gas bubbles from the suspension.

13. The process in accordance with claim 10, further comprising collecting some of the separated gas in the pre-degassing chamber; and
    suctioning at least part of the collected gas out of the pre-degassing chamber.

14. The process in accordance with claim 10, wherein the fibrous paper suspension is guided downwardly from the pre-degassing chamber to the degassing chamber via a falling distance with a height of at least about 1 m.

15. The process in accordance with claim 10, wherein the pre-degassing chamber comprises a horizontally positioned oblong container.

16. The process in accordance with claim 1, wherein, after the degassing chamber, the fibrous paper suspension is exposed to a vacuum sufficient for degassing a post-degassing chamber.

17. The process in accordance with claim 16, wherein the vacuum in the post-degassing chamber is equivalent to the degassing vacuum.

18. A process for degassing a fibrous material suspension in an apparatus that includes a degassing chamber and an element arranged at an inlet of the degassing chamber for dividing the suspension into a plurality of partial streams, the process comprising:

exposing the suspension in the apparatus to a vacuum sufficient to degas the suspension for a duration of at least 10 seconds, whereby gas within the suspension in at least the degassing chamber is separated from the suspension; and suctioning at least a portion of the separated gas out of the degassing chamber.

19. The process in accordance with claim 18, wherein the apparatus further includes a pre-degassing chamber arranged upstream from the degassing chamber, relative to a suspension flow direction, and the pre-degassing chamber is under a vacuum sufficient for degassing, and the exposing of the suspension to the vacuum further comprises forming tangential currents in the suspension in the pre-degassing chamber to remove gas in the suspension from the suspension, and suctioning at least a portion of the removed gas out of the pre-degassing chamber.

20. The process in accordance with claim 19, wherein the degassing chamber and the pre-degassing chamber are arranged such that the suspension falls at least 1 meter from the pre-degassing chamber to the degassing chamber.

21. The process in accordance with claim 20, wherein the suspension is directed downwardly through the element.

22. The process in accordance with claim 20, wherein the suspension is directed upwardly through the element.

23. The process in accordance with claim 18, wherein the apparatus further includes a post-degassing chamber arranged downstream from the degassing chamber, relative to a suspension flow direction, and the exposing of the suspension to the vacuum comprises exposing the suspension to a vacuum sufficient to degas the suspension for the duration to separate the gas within the suspension in the degassing chamber and in the post-degassing chamber from the suspension, and suctioning at least a portion of the separated gas out of the degassing chamber.

24. The process in accordance with claim 23, wherein the degassing of the suspension in the post-degassing chamber comprises forming tangential currents in the suspension in the pre-degassing chamber.

\* \* \* \* \*